US011562643B2

(12) United States Patent
Weber et al.

(10) Patent No.: US 11,562,643 B2
(45) Date of Patent: Jan. 24, 2023

(54) BLUETOOTH™ RADIO MODULE WITH REAL TIME CLOCK

(71) Applicant: Hubbell Lighting, Inc., Shelton, CT (US)

(72) Inventors: Theodore E. Weber, Round Rock, TX (US); Bruce Rhodes, Inverness, IL (US); Christopher Lane Bailey, Greenville, SC (US); Mark Rosenau, West Lake Hills, TX (US); Brian Gaza, Naperville, IL (US)

(73) Assignee: Hubbell Lighting, Inc., Shelton, CT (US)

( * ) Notice: Subject to any disclaimer, the term of this patent is extended or adjusted under 35 U.S.C. 154(b) by 0 days.

(21) Appl. No.: 16/400,372

(22) Filed: May 1, 2019

(65) Prior Publication Data

US 2019/0342981 A1 Nov. 7, 2019

Related U.S. Application Data

(60) Provisional application No. 62/665,717, filed on May 2, 2018.

(51) Int. Cl.
| | | |
|---|---|---|
| *G08C 17/02* | (2006.01) | |
| *H04L 67/125* | (2022.01) | |
| *H04W 76/10* | (2018.01) | |
| *H05B 47/19* | (2020.01) | |
| *H05B 47/11* | (2020.01) | |
| *H05B 47/16* | (2020.01) | |
| *H05B 45/20* | (2020.01) | |
| *H05B 45/30* | (2020.01) | |

(52) U.S. Cl.
CPC ............ *G08C 17/02* (2013.01); *H04L 67/125* (2013.01); *H04W 76/10* (2018.02); *H05B 45/20* (2020.01); *H05B 47/11* (2020.01); *H05B 47/16* (2020.01); *H05B 47/19* (2020.01); *H05B 45/30* (2020.01)

(58) Field of Classification Search
CPC ............ H05B 37/0218; H05B 37/0272; H05B 37/0281; H05B 37/0842; H05B 47/11; H05B 47/16; H05B 47/19; G08C 17/02; H04L 67/125
See application file for complete search history.

(56) References Cited

U.S. PATENT DOCUMENTS

| | | |
|---|---|---|
| 2004/0165480 A1 | 8/2004 | Shemesh et al. |
| 2008/0185977 A1 | 8/2008 | Veskovic et al. |

(Continued)

OTHER PUBLICATIONS

PCT/US2019/030151 International Search Report and Written Opinion dated Jul. 18, 2019 (12 pages).

*Primary Examiner* — Alexander H Taningco
*Assistant Examiner* — Pedro C Fernandez
(74) *Attorney, Agent, or Firm* — Michael Best & Friedrich LLP

(57) ABSTRACT

A system including a lighting controller and a radio adapter. The lighting controller includes a smart port and is configured to control at least one lighting fixture. The radio adapter is communicatively coupled to the lighting controller via the smart port. The radio adapter is configured to establish a wireless communication link between the lighting controller and an external device, communicatively couple the external device to the lighting controller via the smart port, and provide a master clock timing signal to the lighting controller via the smart port.

5 Claims, 2 Drawing Sheets

(56) References Cited

U.S. PATENT DOCUMENTS

| | | | |
|---|---|---|---|
| 2013/0117580 A1* | 5/2013 | Chin | G06F 1/266 |
| | | | 713/300 |
| 2016/0057838 A1* | 2/2016 | Maros | H05B 47/10 |
| | | | 315/291 |
| 2016/0127118 A1* | 5/2016 | Yun | H04L 7/0008 |
| | | | 375/357 |
| 2016/0323980 A1* | 11/2016 | Weber | H04L 12/6418 |
| 2017/0064795 A1* | 3/2017 | Stockburger | H05B 37/0227 |
| 2017/0308048 A1 | 10/2017 | Weber et al. | |

\* cited by examiner

BLUETOOTH™ RADIO MODULE WITH REAL TIME CLOCK

RELATED APPLICATION

This application claims priority to U.S. Provisional Patent Application No. 62/665,717, filed on May 2, 2018, the entire contents of which are incorporated herein by reference.

FIELD

Embodiments described herein relate to lighting system control, and, more particularly, to lighting system control using Bluetooth™ or other wireless communications capabilities.

SUMMARY

One embodiment discloses a system including a lighting controller and a radio adapter. The lighting controller includes a smart port and is configured to control at least one lighting fixture. The radio adapter is communicatively coupled to the lighting controller via the smart port. The radio adapter is configured to establish a wireless communication link between the lighting controller and an external device, communicatively couple the external device to the lighting controller via the smart port, and provide a master clock timing signal to the lighting controller via the smart port.

Another embodiment provides a device including a real-time clock, a transceiver, and an electronic processor. The electronic processor is configured to communicatively couple the device to a lighting fixture network via the transceiver, and transmit, via the transceiver, a time stamp message to the lighting fixture network, the time stamp message including the current time and date. The electronic processor is further configured to initialize a timer based on a priority value for the device, listen, via the transceiver, for a second time stamp message from a second device, and when the timer expires before receiving the second time stamp message, transmit a third time stamp message.

Yet another embodiment provides a device configured to communicatively couple to a lighting controller. The device includes a real-time clock, a transceiver, and an electronic processor. The electronic processor is configured to communicatively couple an external device to the lighting controller, and provide a timing signal to the lighting controller.

Other aspects of the application will become apparent by consideration of the detailed description and accompanying drawings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
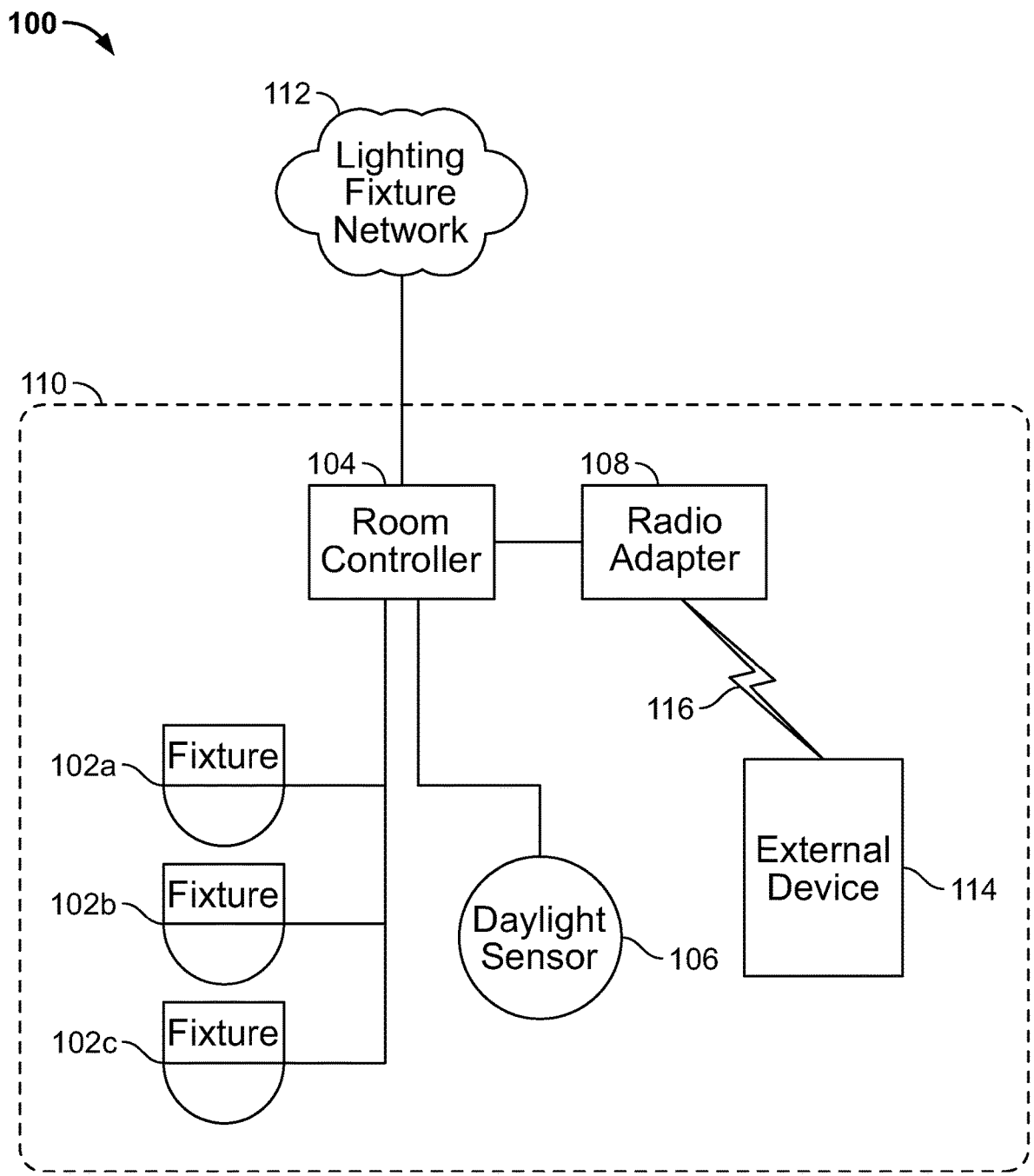
FIG. 1 schematically illustrates lighting control system, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments presented herein provide, among other things, a Bluetooth™ radio module with an integrated real-time clock for controlling lighting fixtures.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

For ease of description, each of the exemplary systems or devices presented herein is illustrated with a single exemplar of each of its component parts. Some examples may not describe or illustrate all components of the systems. Other exemplary embodiments may include more or fewer of each of the illustrated components, may combine some components, or may include additional or alternative components.

FIG. 1 schematically illustrates an example embodiment of a lighting control system 100. The system 100 includes lighting fixtures 102a-c (e.g., LED lighting fixtures), a room controller 104, a daylight sensor 106, and a radio adapter 108. The system 100 operates to control the lighting fixtures 102a-c and other electrical loads (not shown) for rooms or zones, multiple rooms or zones that are combined into areas, and multiple areas (for example, the room 110). In some embodiments, the lighting system 100 operates to control electrical loads across entire buildings and grounds that are separated by rooms, hallways, and/or exterior areas. In some embodiments, lighting system 100 employs an area/zone/ group assignment strategy. In some embodiments, lighting fixtures 102a-c or other devices may be programmed to participate in only one area; however, they may belong to one or all of the available zones and groups within the area. Assignments in the areas, zones, and groups can be made through a commissioning tool (e.g., a computer program). In some embodiments, areas are used as a method of separating buildings or floors, zones to separate individual room or locations of control, and groups to configure control assignments within the rooms or locations.

The lighting fixtures 102a-c and other devices in the system 100 are communicatively coupled to and participate in a lighting fixture network 112. The lighting fixture network 112 may includes wired networks (for example, Ethernet, RS-485, HubbNET™, and the like), wireless networks (for example, Wi-Fi™ and Bluetooth™), and combinations of the foregoing. In some embodiments, the lighting fixture network 112 includes area controllers (for example, a Hubbell® NXAC-120 NX Area Controller) and other devices that operate according to the NX Distributed Intelligence™ lighting control platform by Hubbell®. In some embodiments, the lighting fixtures 102a-c and the daylight sensor 106 are connected to the room controller 104 over a bus using the RS-485 serial communication standard that includes one or more conductors connecting the devices in a daisy chain or multi-drop configuration. In some embodiments, the illustrated devices connect to the bus using Hubbell® NX Smart Port™ technology. In some embodiments, the bus operates as illustrated and described in U.S. patent application Ser. No. 15/495,159 ("DEVICES, SYSTEMS, AND METHODS FOR CONTROLLING ELECTRICAL FIXTURES), filed Apr. 24, 2017, the entire contents of which are hereby incorporated by reference.

The room controller 104 (for example, a Hubbell® NXRC-2RD-UNV Room Controller) operates to connect the lighting fixtures 102a-c and the daylight sensor 106 to the lighting fixture network 112, to control the lighting fixtures 102a-c (for example, based on input from the daylight sensor 106) locally, or a combination of both. In some embodiments, one or more of the lighting fixtures 102a-c are also controlled by another controller (not shown) on the lighting fixture network 112. In some embodiments, one or more of the lighting fixtures 102a-c include an integral controller. The daylight sensor 106 senses light levels (for example, using a photodiode element) and reports those levels to other devices in the system 100 (for example, the room controller 104).

The radio adapter 108, described more particularly below with respect to FIGS. 2 and 3, enables the room controller 104 to communicate with, among other devices, an external device 114, such as a portable electronic device. In some embodiments, the radio adapter 108 implements Bluetooth™, Wi-Fi™, or another wireless communications protocol. As illustrated in FIG. 1, the room controller 104 is communicatively coupled to the portable electronic device 112 via a communications link 116. In some embodiments, the communications link 160 is a Bluetooth™ link.

The portable electronic device 114 may be a portable computing device including at least an electronic processor, a memory, and an input/output interface. In some embodiments, the portable electronic device 114 implements Bluetooth™, Wi-Fi™, or another wireless communications protocol that allows communication with the room controller 104 via the radio adapter 108. The portable electronic device 114 executes software that allows it to communication with, configure, and control the room controller 104 via the communications link 116. In some embodiments, the portable electronic device 114 is a smart telephone. In other embodiments, the portable electronic device 114 may be a tablet computer, a smart watch, a laptop computer, a smart light switch, a remote user-interface, a combination of the foregoing, or another portable or mobile electronic device containing software and hardware enabling it to operate as described herein.

The room controller 104 includes hardware and software components that allow it to keep track of elapsed time, however, it may lack a real-time clock to keep track of the current actual time and date. As a consequence, in some embodiments upon power up or restart, the room controller 104 must determine the current time and date from a time server. The lighting fixture network 112 may include at least one such time server. A time server is a device with a real-time clock, which provides the current time and date to other devices on the lighting fixture network 112 (for example, by creating messages with the current time and date on the lighting fixture network 112). In some embodiments, the room controller 104, and other devices of the lighting fixture network 112 choose from among multiple time servers based on each time server's distance (over the network) from the room controller 104. In some embodiments, a plurality of time servers may exist. In the case where there are multiple time servers in a control network, a method has been developed that allows one time server to become the master time server. Devices participating in the network as time servers are given a priority value based on their device type. The priority value determines the frequency at which time stamp messages are initiated by that particular type of device. The device with the highest priority sends time stamp messages most frequently and therefore has the shortest time between time stamp messages. Each time server sends a time stamp message, and then waits for a predetermined time period (e.g., starts a timer), based on its priority value, before sending another time stamp message. Unless the time server receives a time stamp message from another time server during the time period, it will send another time stamp message when the time period expires. When a time server receives a time stamp message from another time server, it will update its own time, and reset its priority timer. In this way, a control network with multiple time servers will eventually have all but one time server (that is, the server with the highest priority) stop sending messages. Furthermore, this method also ensures that, if a master time server is removed from the network, another device can take over the role of master.

Should the room controller 104 be unable to ascertain the current time, its functionality may be substantially degraded. For example, the room controller 104 may be configured to run a time-based schedule that adjusts the color temperature and brightness for the lighting fixtures 102a-c based on human circadian rhythms or a user-programmed schedule. If the room controller 104 cannot determine the current time, it is unable to run a timed schedule. Through its connection to the radio adapter 108, the room controller 104 can receive the current time locally. The room controller 104 can thus maintain its ability to run time-based lighting control schedules when other timing sources are unavailable. Similarly, coupling a room controller with a radio adapter as described herein allows a room controller installed in a stand-alone manner to run time-based schedules for controlling lighting fixtures connected to it.

Figure 2:
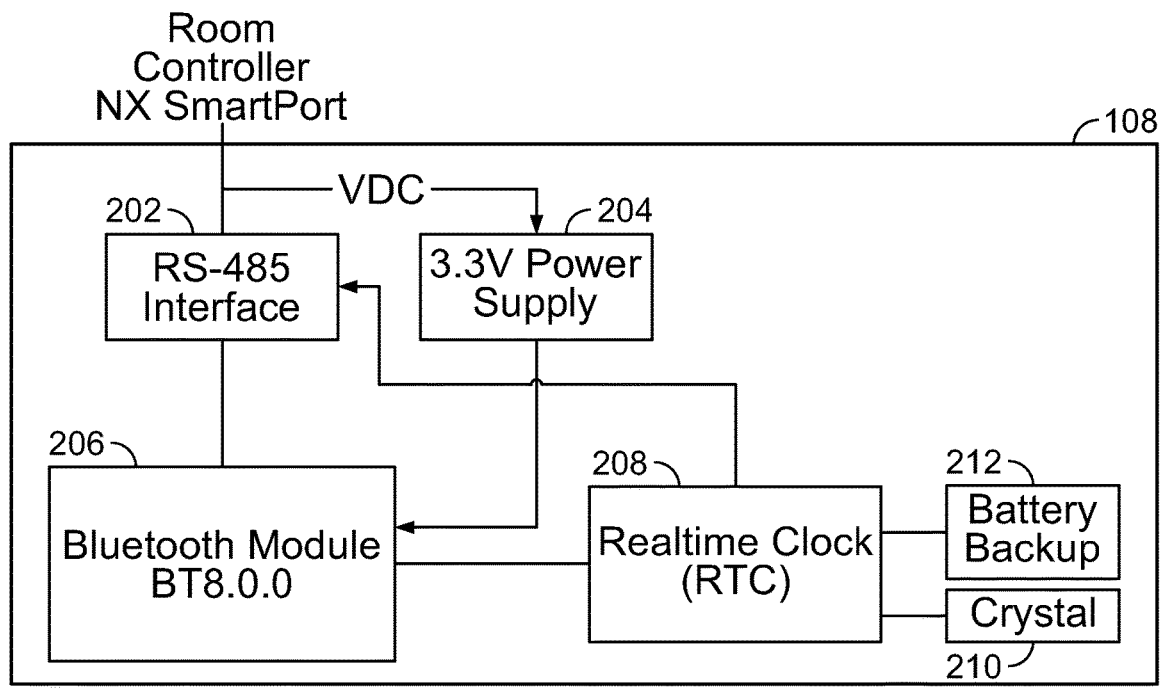
FIG. 2 schematically illustrates a radio module of the system of FIG. 1, according to some embodiments.
Figures 3A, 3B:
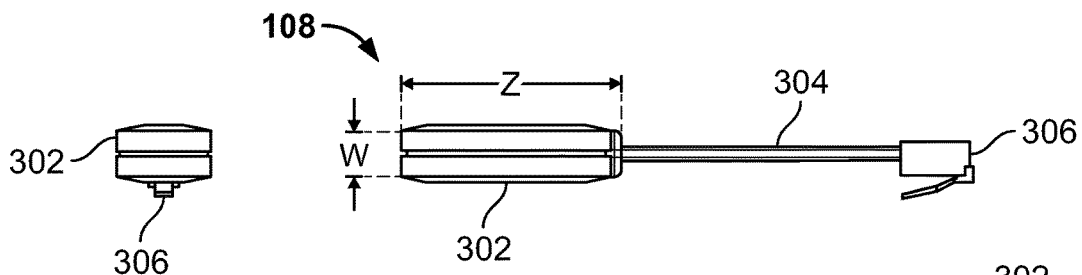
FIGS. 3A-3E illustrate various views of the radio module of the system of FIG. 1, according to some embodiments.
Figure 3C:
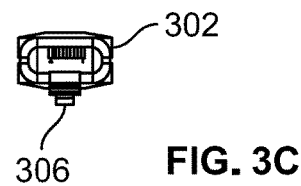
Figure 3D:
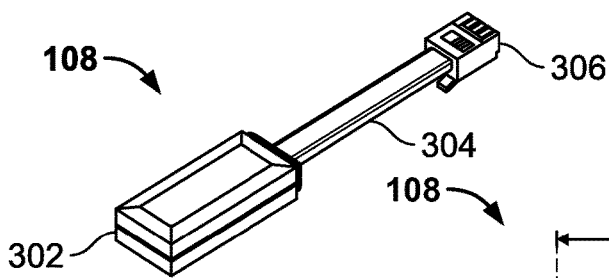
Figure 3E:
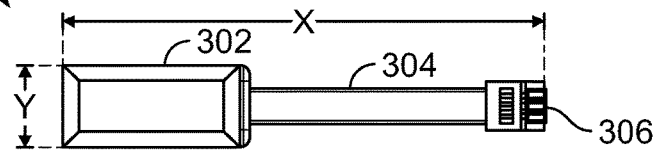

FIG. 2 schematically illustrates an example embodiment of the radio adapter 108. In the example illustrated, the radio adapter 108 includes an RS-485 interface 202, a power supply 204, a radio module 206, a real-time clock 208, a crystal oscillator 210, and a battery backup 212. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

In some embodiments, the RS-485 interface 202 includes an RS-485 transceiver, a cable, and an RJ-45 connector. The RS-485 interface 202 allows the radio adapter 108 to connect to an NX Smart Port™ of the room controller 104. The radio adapter 108 draws power from the NX SmartPort™, which is regulated and supplied to the components of the radio adapter 108 by the power supply 204. In the embodiment illustrated, the power supply 204 supplies 3.3V to the other components.

The radio module 206 includes hardware (for example, electronic processors, antennas, transceivers, baseband processors, digital signal processors, and the like) and software for providing wireless connectivity (for example, to the portable electronic device 114). In some embodiments, devices wirelessly connected to the radio adapter 108 via the radio module 206 are able to communicate to the room controller 104 as if wired to an NX SmartPort™ of the room controller 104. In the illustrated embodiment, the radio module 206 implements the Bluetooth™ wireless communications protocol. However, in other embodiments, the radio module 206 may implement other wireless communication protocols, such as but not limited to, WiFi, ZigBee, etc.

The real-time clock 208 is an electronic clock (for example, on an integrated chip), which keeps track of the current time. The real-time clock 208 keeps time using the crystal oscillator 210. The crystal oscillator 210 is an electronic oscillator circuit that uses the mechanical resonance of a vibrating crystal of piezoelectric material to create an electrical signal with a precise frequency (for example, 32.768 kHz).

The real-time clock 208 may be powered by the power supply 204 when the radio adapter 108 is plugged into an NX SmartPort™. When the radio adapter 108 is not drawing power from the RS-485 interface 202, the battery backup 212 powers the real-time clock 208. In some embodiments, the battery backup 212 may provide power using a battery (for example, a lithium battery). In some embodiments, the battery backup 212 provides power using a high-capacity capacitor or a supercapacitor. In some embodiments, the battery backup 212 is charged via power from the RS-485 interface 202 (for example, from the room controller 104.

The battery backup 212, when fully charged, provides enough power to keep the real-time clock functioning for 72-100 or more hours in the absence of power on the RS-485 interface 202. In some embodiments, the radio adapter 108, using an electronic processor the radio module 206 and the real-time clock 208, operates as a time server for the lighting fixture network 112, as described above.

FIGS. 3A-3E illustrate a perspective view, and top, back, side, and front views of an example embodiment of the radio adapter 108. It should be noted that the dimensions show in FIG. 3 are for one example embodiment only, and are approximate. In the embodiment illustrated, the radio adapter 108 includes a housing 302, which houses the electronic components of the radio adapter 108. The radio adapter 108 also includes a cable 304 and a connector 306. In one embodiment, the cable 304 is an 8-conductor ribbon cable and the connector 306 is an RJ-45 connector. The cable 304 couples the RJ-45 connector to the RS-285 interface 202. The radio adapter 108 is coupled to the room controller 104 when the connector 306 is inserted into an NX SmartPort™ of the room controller 104.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Various features and advantages of some embodiments are set forth in the following claims.

What is claimed is:

1. A device comprising:
   a real-time clock;
   a transceiver coupled to a smart port;
   a battery backup configured to provide power to the device and be charged via the smart port; and
   an electronic processor configured to
      communicatively couple the device to a lighting fixture network via the smart port;
      transmit, via the smart port, a time stamp message to the lighting fixture network, the time stamp message including the current time and date;
      initialize a timer based on a priority value for the device;
      listen, via the transceiver, for a second time stamp message from a second device; and
      when the timer expires before receiving the second time stamp message, transmit a third time stamp message,
   wherein the priority value determines the frequency at which stamp messages are transmitted by the transceiver,
   wherein the priority value is based on a device type, and
   when the second time stamp message is received before the time expires, reset the timer, and set the real-time clock based on a time and date included in the second time stamp message.

2. The device of claim 1, wherein the electronic processor is further configured to communicatively coupled an external device to a lighting controller.

3. The device of claim 2, wherein the communicative coupling is wireless.

4. The device of claim 1, wherein the device further comprises a battery.

5. The device of claim 4, wherein the device is powered via a the battery when external power is unavailable.

* * * * *